(12) United States Patent
Toriyama (10) Patent No.: US 7,462,948 B2
(45) Date of Patent: Dec. 9, 2008

(54) MIDGET GAS TURBINE

(75) Inventor: Akira Toriyama, Tokyo (JP)

(73) Assignee: Thinktank PHOENIX Co., Ltd., Tokyo (JP)

( * ) Notice: Subject to any disclaimer, the term of this patent is extended or adjusted under 35 U.S.C. 154(b) by 1442 days.

(21) Appl. No.: 10/379,805

(22) Filed: Mar. 6, 2003

(65) Prior Publication Data

US 2008/0231051 A1    Sep. 25, 2008

(51) Int. Cl.
    *H20P 9/00* (2006.01)
(52) U.S. Cl. ............... 290/52; 290/40 R; 290/40 A; 290/40 C; 322/14; 322/15; 322/16
(58) Field of Classification Search ............. 290/52, 290/40 A, 40 C, 40 R; 322/14, 15, 16
    See application file for complete search history.

(56) References Cited

U.S. PATENT DOCUMENTS

| 5,408,824 | A | 4/1995 | Schlote |
| 5,932,940 | A | 8/1999 | Epstein et al. |
| 6,787,933 | B2 * | 9/2004 | Claude et al. ............ 290/52 |
| 6,847,129 | B2 * | 1/2005 | McKelvey et al. ........ 290/52 |
| 6,888,263 | B2 * | 5/2005 | Satoh et al. ............. 290/52 |
| 6,900,553 | B2 * | 5/2005 | Gozdawa ................ 290/52 |

FOREIGN PATENT DOCUMENTS

| JP | 143330 | 2/1941 |
| JP | 47-35611 | 11/1972 |
| JP | 62-228629 | 10/1987 |
| JP | 2-299439 | 12/1990 |

* cited by examiner

Primary Examiner—Darren Schuberg
Assistant Examiner—Iraj A Mohandesi
(74) Attorney, Agent, or Firm—Oblon, Spivak, McClelland, Maier & Neustadt, P.C.

(57) ABSTRACT

The present invention provides a midget gas turbine has:
  a casing;
  an irregular-shaped hollow disk rotationally attached to a casing; said irregular-shaped hollow disk having in a hollow portion constituting a bursiform space having a closed peripheral portion in which a guiding vane is provided, and having a radius changing with respect to the circumferential direction;
  a fuel conduit provided from a central portion towards a portion of the outer peripheral portion of the irregular-shaped hollow disk and communicated with a fuel nozzle provided in the vicinity of the outer peripheral portion of the irregular-shaped hollow disk; and
  at least two combustion chambers each comprising a mixing portion for mixing a fuel injected from the fuel nozzle with an external air centrifugally compressed by the guiding vane, a combustor and a combustion gas discharge nozzle portion, said combustion chambers being provided at rotationally symmetric positions at the outer peripheral portion of the irregular-shaped hollow disk where the radius becomes maximum;
  wherein an external air taken in the hollow portion of the irregular-shaped hollow disk is compressed by the guiding vane, supplied to the combustion chambers, mixed with a fuel supplied from the fuel conduit to be burnt, and a combustion gas discharged from the combustion gas discharge nozzle is discharged towards a substantially circumferential direction of the irregular-shaped hollow disk, whereby the irregular shaped hollow disk is driven by the reaction of the combustion gas.

10 Claims, 6 Drawing Sheets

MIDGET GAS TURBINE

BACKGROUND OF THE INVENTION

1. Field of the Invention

The present invention relates to a midget gas turbine to be used as a supply source of electric power necessary for long time continuous use of various portable electric and electronic devices such as portable personal computers, portable communication terminals, video cameras and portable television sets in indoor or outdoor places where there is no electric utilities, and to be used as a heat source for preheating a fuel cell, serving also as an auxiliary electric power source for reducing a startup time of the fuel cell from its start to a full power operation, which was a demerit of a conventional fuel cell.

2. Discussion of Background

As an electric power source used for portable electric devices such as portable personal computers, portable communication terminals, portable printers, portable radio-cassette recorders, video cameras, portable television sets, etc., a rechargeable battery or a dry cell has been used. Technical developments have been made to these electric power sources to decrease the weight and to increase the electric energy to be stored.

On the other hand, technical developments to decrease electric power consumption of portable electric devices have also been seen. Due to a synergistic effect obtained by improving the performance of the power consuming devices and the performance of power sources, the continuous operational time is significantly increasing. However, in spite of these continuous technical developments, the principle of these electric power sources is still such that a chemical energy is stored and transformed into an electric energy for use, and as a result, there is a limit in available electric generation per weight. Therefore, there has been a demerit that extra batteries or many dry cells have to be carried for auxiliary use when a portable electric device is used for long time at an indoor or outdoor place where there is no electric utilities.

For example, in a case of live broadcasting of a sport program or a live show by using a portable PC, a digital camera and a communication terminal, the available time for continuous use for each of the devices is usually one or two hours because of its built-in batteries. For a live broadcasting of several hours or more than ten hours, a heavy storage battery or an electric generator was necessary as an additional equipment in order to supply a necessary electric power for long time.

Fuel cells have been expected as power sources for next generation vehicles or for medium or small-sized co-generation plants. Many technical developments have continuously been conducted to fuel cells. However, there is a major technical problem to be solved in that it takes a long startup time from its start to a full power operation. The current technique to a fuel cell has not been developed to such an extent that it has an excellent startup performance enabling a car to start moving immediately after turning a starter key like an automobile having a gasoline engine or a diesel engine in the conventional technique.

SUMMARY OF THE INVENTION

Because of a rapid spread of internet and a spread of image devices such as portable PCs, portable communication terminals, digital cameras and video cameras, requirements of a long time use of those devices in an indoor or outdoor place where there is no electric utilities and connecting them to the internet to receive or send data when necessary, would increase more and more not only for a business purpose but also for a personal purpose.

A first object of the present invention is to provide a midget portable gas turbine electric generator of light weight which can be carried together with a set of image processing devices including a portable PC, a portable communication terminal and a digital camera as well as documents or traveling goods in a brief case or a traveling bag and which enables a continuous use of these devices more than 10 hours or several ten hours without recharging by external power sources.

Further, a fuel cell, particularly, a fuel cell for automobiles, is required to generate an electric power to start moving the automobile within several seconds after the start, in consideration of competition with conventional gasoline or diesel engines. However, it is extremely difficult for the fuel cell to have a construction capable of generating an electric power strong enough to start moving an automobile within such a short time.

A second object of the present invention is to provide a midget light-weight gas turbine electric generator used as an auxiliary electric power source for a fuel cell, which functions as an auxiliary electric power source for compensating a power shortage in a time from the starting to a full power operation of an automobile use or a stationary fuel cell, and which functions as a preheater of the fuel cell or a reformed gas generator by introducing exhaust gas to the fuel cell.

In order to achieve the above objects, there is provided a midget gas turbine comprising:

an irregular-shaped hollow disk having in a hollow portion constituting a bursiform space having a closed peripheral portion in which a guiding vane is provided, and having a radius changing with respect to the circumferential direction, wherein said irregular-shaped hollow disk, has a first cylindrical hollow axis communicated with a disk-shaped space formed inside the irregular-shaped hollow disk, and a second axis having in its central portion a fuel supplying hole communicated with a fuel conduit provided along a wall of the irregular-shaped hollow disk from its central portion towards its periphery, said first hollow axis and said second axis protrude from respective sides of a central portion of the irregular-shaped hollow disk, to be supported rotatably by bearings, and said first hollow axis has an end opening to the external air so that the disk-shaped space is communicated with the external air;

a fuel supply pipe inserted into the fuel supply hole at the central portion of the second axis to supply fuel from outside, and provided with a sealing device between the fuel supplying hole and the fuel supplying pipe to prevent external air from entering and to provide a rotatable structure;

said fuel conduit being provided along the wall of the irregular-shaped hollow disk connected to a fuel nozzle provided in the vicinity of the outer periphery of the irregular-shaped hollow disk;

at least two combustion chambers each comprising a mixing portion for mixing a fuel injected from the fuel nozzle with an external air centrifugally compressed in the disk space, a combustor and a combustion gas discharge nozzle portion; said combustion chambers being provided at rotationally symmetric positions at the outermost peripheral portion of the irregular shaped hollow disk; and an ignition plug or an ignition pilot burner provided at the casing wall in the vicinity of the outlet of the combustion gas discharge nozzle;

whereby a combustion gas discharged from the combustion gas discharge nozzle portion is discharged towards a substantially circumferential direction.

Further, there is provided a midget gas turbine comprising:

a steel disk holding a disk-shaped permanent magnet having at least one pair of N-pole and S-pole disposed alternately in the circumferential direction, said steel disk being integrally attached to the first hollow axis or the second axis so as to be co-axial with the first hollow axis and/or the second axis;

at least one wire-wound coil made of an electro-conductive material disposed in the circumferential direction so as to face the disk-shaped permanent magnet, wherein a wire-wound coil is fixed to a stator to obtain a single-phase alternate current from both ends of the wire-wound coil, or a plurality of wire-wound coils are grouped to constitute a Y-wiring or a Δ-wiring and fixed to a stator to obtain a three-phase alternate current from ends of the grouped wire-wound coils.

By a rotation of the irregular-shaped hollow disk, the external air sucked in the external air suction direction from the end of the first hollow axis is centrifugally compressed by an effect of the guiding vane as the air flows in the sucked external air flow direction, to reach the mixing portion.

A fuel supplied in the fuel gas supply direction from the fuel supply pipe, is isolated from the external air by means of the sealing device, passed through the fuel supplying hole provided at the center of the second axis, centrifugally compressed as it flows in the fuel flow direction in the fuel conduit provided in the irregular-shaped hollow disk, injected from the fuel nozzle, mixed with the centrifugally compressed external air, continuously burned in the combustor and discharged as a high temperature combustion gas from the combustion gas discharge nozzle portion towards the combustion gas discharge direction at a subsonic or supersonic speed.

A rotational body comprising the irregular-shaped hollow disk, the first hollow axis, the second axis and the electric generator disk, is supported by bearings at its both ends, and rotated by the reaction of the combustion gas discharged towards a combustion gas discharge direction 29 from the combustion gas discharge nozzle portion.

The combustion gas discharged at a relative speed V from the combustion gas discharged nozzle portion of the rotating combustion chamber towards the combustion gas discharge direction, flows into a diffuser portion at an absolute speed and direction given by C as the sum of the vector V and a circumferential speed vector W at the discharge nozzle portion, flows through a scroll-shaped exhaust chamber at a reduced speed and flows out from a combustion gas exit towards a combustion gas flow-out direction.

The electric generator disk comprising a steel disk holding a disk-shaped permanent magnet is integrally attached to the first hollow axis or the second axis so as to be co-axial with the first hollow axis and/or the second axis. At least one group of wire-wound coils made of an electro-conductive material is disposed in the circumferential direction so as to face the disk-shaped permanent magnet. The wire-wound coils are fixed to a stator to obtain an electricity from both ends of the wire-wound coils, whereby a single-phase alternate electric generator or a three-phase alternate electric generator can be constituted, which is a brushless generator having no mechanical contact to the rotational body and requiring no voltage for excitation.

The high frequency single-phase or three-phase alternate current obtained from terminals provided at both ends of the wire-wound coils, may be converted into a direct current by means of a AC/DC converter, not shown, before taking out.

As described above, according to the present invention, a combustion chamber is disposed at a position where the radius of a centrifugal compressor is maximum, a high temperature combustion gas is discharged from the outermost peripheral portion of the centrifugal compressor towards a substantially circumferential direction at a high speed, and the centrifugal compressor is driven by the discharged combustion gas. On the other hand, the system of a conventional gas turbine is such that air is converted into a velocity energy by means of a compressor impeller, the velocity energy taken out is converted into a pressure energy by a diffuser, a fuel is added to produce a high temperature-high pressure combustion gas, which is introduced into a gas turbine nozzle to convert the pressure energy to a velocity energy, and introduced into the gas turbine impeller to take out the power. As compared with such a conventional gas turbine, the present invention can omit intermediate steps, and achieves a compression, combustion and driving of the rotational body by the reaction of the discharged gas in a single rotational body, whereby a small-sized light-weight low-cost gas turbine can be obtained. Further, the present invention is constituted such that the radius of the irregular-shaped hollow disk is maximum at a position where the combustion chamber is disposed, and the radius of the irregular-shaped hollow disk is minimum at a position between the combustion chambers. Such a structure reduces a heat stress in the circumferential direction caused by a temperature difference generated between the vicinity of the combustion chamber which is exposed to the combustion gas and has a high temperature, and the central portion which has a relatively low temperature, whereby a high speed rotation is possible. In addition, the present invention has such a construction that a disk-shaped ultra thin alternate current electric generator is integrally attached to the gas turbine, whereby not only the entire device can be small-sized, light in weight and low cost, but also an ultra thin disk-shaped gas turbine electric generator can be constituted.

The midget gas turbine electric generator of the present invention can be formed to have a small size which can accommodate a gas turbine main body, an electric generator, a cassette fuel bottle, a DC converter or an inverter and a combustion controller in a space of 100 mm long, 190 mm wide and 25 mm thick, which is substantially the same in size as a video cassette tape. For example, such a midget gas turbine electric generator can continuously generate about 40 W of electric power for 4 hours with a butane gas bottle for a gas lighter having a net weight of 70 g.

Thus, the present invention permits a continuous long-time electric generation by a small-sized light-weight device. Accordingly, the present invention is applicable not only to an on-site electric power source for live broadcasting of sports or various events, but also to an emergency electric power source for personal or business use, a leisure, an outdoor academic research or a military affair.

Further, the midget gas turbine electric generator of the present invention is expected to provide a large effect for improving the startup characteristics of a fuel cell, particularly a fuel cell for vehicles. Since a fuel cell converts a chemical energy into an electric energy, it is extremely difficult for the fuel cell to render the vehicle to be a state capable of moving immediately after turning the starter key like a gasoline engine or a diesel engine as a conventional engine for vehicles. Therefore, a hybrid construction constituted by a gas turbine generator of the present invention and the fuel cell wherein the gas turbine generator of the present invention functions as an auxiliary electric power source for the fuel cell until the fuel cell warms up can solve the largest demerit of the fuel cell. Further, by supplying an exhaust from the gas turbine to the fuel cell, it is expected as an auxiliary effect to shorten the warm-up time of the fuel cell.

Further, the midget gas turbine of the present invention can be applied as an electric power source for a next generation robot which is a self-supporting type robot having an intelligence, or as an electric generator for a small-sized co-generation plant.

DETAILED DESCRIPTION OF THE PREFERRED EMBODIMENTS

Figure 1:
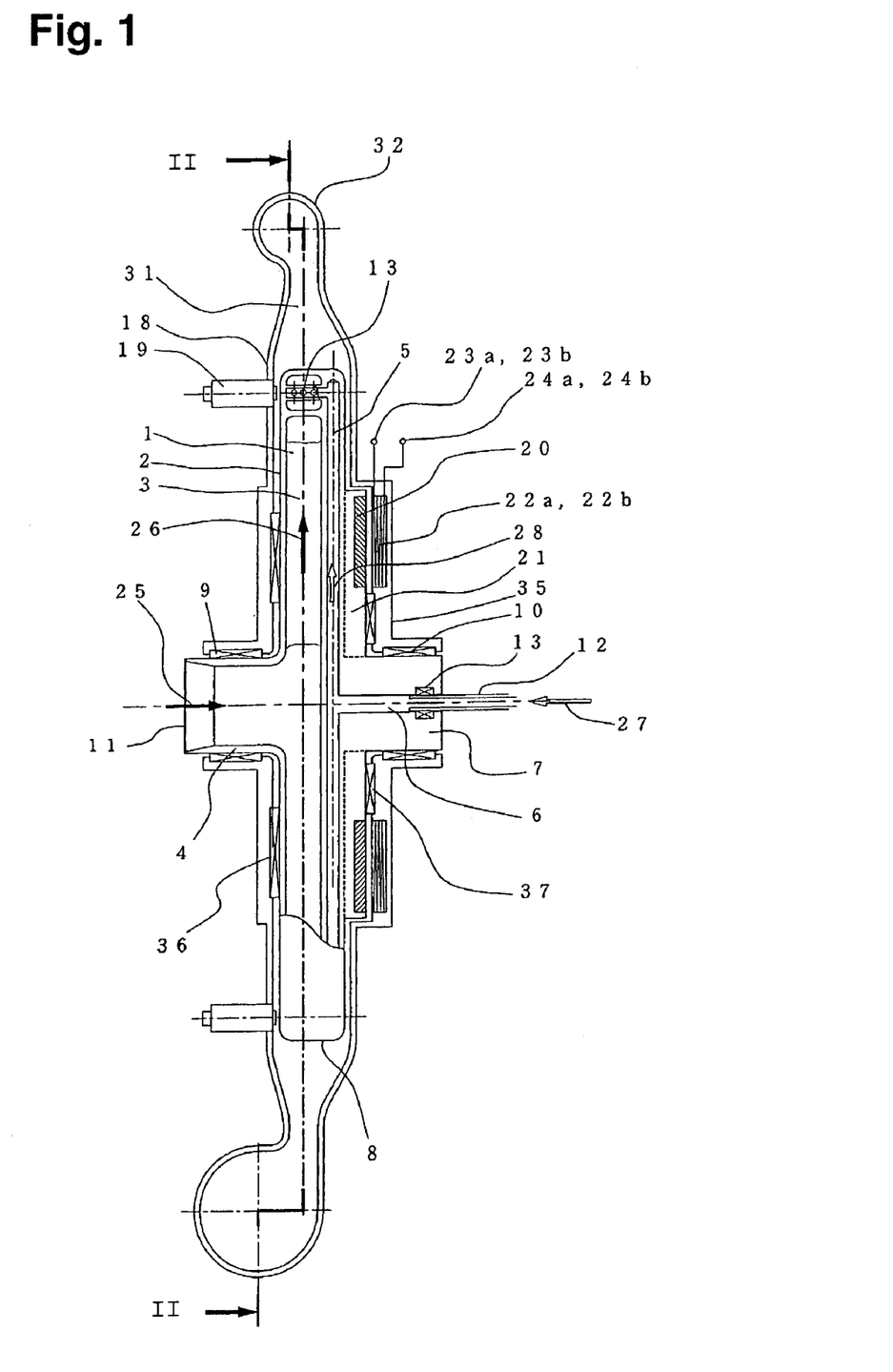
FIG. 1 is a front cross-sectional view showing a basic construction of an embodiment of the midget gas turbine of the present invention.
Figure 2:
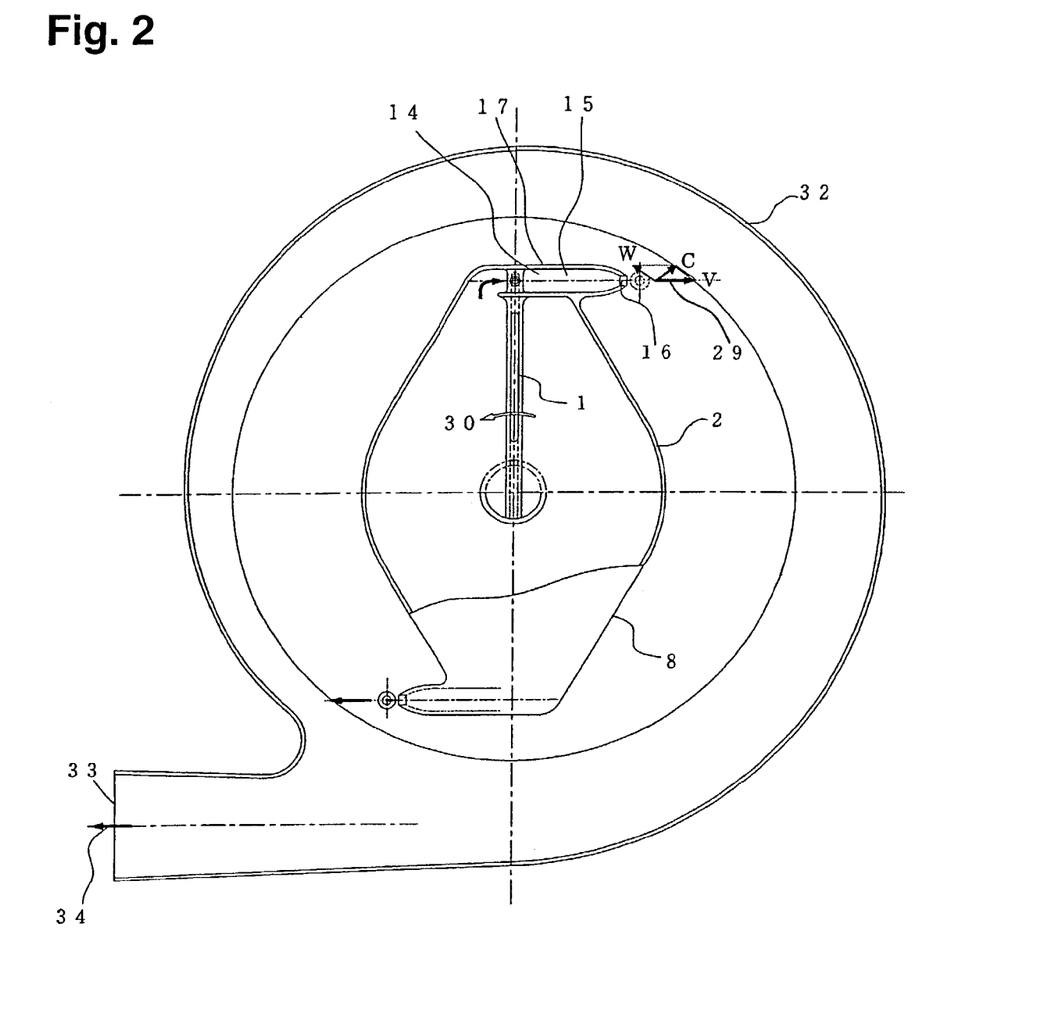
FIG. 2 is a cross-sectional view taken along a line II-II in FIG. 1.

Now, some embodiments of the present invention will be described in detail with reference to FIGS. 1 and 2. FIG. 1 is a schematic front cross-sectional view showing the basic structure of the midget gas turbine electric generator of an embodiment of the present invention. FIG. 2 is a plane cross-sectional view along a line II-II in FIG. 1.

A structure having an irregular-shaped hollow disk 2 constituting a bursiform space having a closed peripheral portion in which a guiding vane 1 extends in a radial direction, a first hollow axis 4 protruded from a central portion of the disk 2, having an end 11 opened to the external air, and a disk-shaped space 3 in the disk 2 communicating with a hollow portion of the first hollow axis 4, is a so-called centrifugal compressor. The first hollow axis 4 and a second axis 7 which are protruded from respective sides of a central portion of the disk 2, are respectively rotatably supported by bearings 9 and 10. Accordingly, by applying a rotational power to the disk 2, the external air sucked from the end 11 is accelerated and centrifugally compressed by an effect of the guiding vane in the disk-shaped space 3.

On the other hand, the second axis 7 is provided with a fuel supplying hole 6 at a central portion of the axis communicating with a fuel conduit 5 provided along the wall of the disk 2 from its central portion towards its periphery. A fuel supplying pipe 12 for supplying a fuel from outside is inserted in the fuel supply hole 6, and a sealing device 13 is provided between the fuel supplying pipe 12 and the fuel supplying hole 6 to prevent external air from entering and to provide a rotational structure, whereby the fuel gas can be supplied to a fuel nozzle 13 disposed at the outermost peripheral portion of the disk 2 via the fuel conduit 5 provided along the wall of the disk 2 from its central portion towards its periphery without escaping to the external air and sucking the external air.

Since the fuel is centrifugally compressed by a rotational force when it is passed through the fuel conduit 5 provided at the wall of the disk 2, which also functions as a suction blower or a pump for the fuel, it is not necessary to feed the fuel by a high pressure.

The fuel in a form of a gas or a mist injected from the fuel nozzle 13 located at the peripheral portion of the disk 2 via the fuel conduit 5 is mixed with an external air centrifugally compressed in the disk-shaped space 3 in the mixing portion 14, burned in the combustor 15 to be a high temperature combustion gas and discharged from the combustion gas discharge nozzle portion 16 at a subsonic or supersonic speed towards a substantially circumferential direction of the disk 2. A rotational body 8 comprising the disk 2, the first hollow axis 4 and the second axis 7, receives a rotational force in the direction indicated by an arrow 30 by the reaction of the high speed combustion gas discharged from the combustion gas discharge nozzle portion 16 (refer to FIG. 2).

The number of the combustion chambers 17 each comprising the fuel gas mixing portion 14, the combustor 15 and the combustion gas discharge nozzle portion 16, should be at least two at rotationally symmetric positions, preferably at least three to obtain both a merit of stability against vibrations and a merit of an increase of the output power as a turbine.

Further, an ignition plug or a pilot burner 19 is provided at a casing wall portion 18 in the vicinity of the discharge nozzle portion 16 to start the gas turbine.

Each of the bearings 9 and 10 for supporting the rotational body 8 comprising the disk 2, the first hollow axis 4 and the second axis 7, may be any one of a rolling bearing, a slide bearing, a magnetic bearing or a gas bearing, preferably a gas bearing, particularly, a dynamic pressure type gas bearing, since the circumferential speed of the bearing is high. Here, thrust bearings 36 and 37 for restricting the movement in the axial direction of the rotational body 8, are also preferably dynamic pressure type gas bearings.

The fuel to be used for the gas turbine of the present invention may not be a gas at the room temperature, and may be a fuel injectable from the fuel nozzle 13 in a form of a gas or a mist so that a gas or fluid material which causes an exothermal reaction when it is mixed with an oxidation gas and ignited can be burnt entirely. As an example of a material useful as the fuel, a gas form or liquid form hydrocarbon, an alcohol, methanol, a liquid or gas hydrogen or hydrazine may be mentioned. Further, as the oxidation gas, air, pure oxygen, an oxygen mixed gas or a hydrogen peroxide mixed gas may be mentioned.

The combustion chamber is preferably a catalyst combustion chamber capable of maintaining a stable combustion without losing a fire not only at a normal burner combustion but also at a combustion with a lean fuel. As a material for the catalyst combustion chamber, a honeycomb-shaped, a grid-shaped or a sintered material coated with a metal such as platinum, copper, vanadium, tungsten, molybdenum or manganese, or its oxide on the base material.

In this embodiment, an exhaust chamber 32 communicating with a diffuser portion 31 has a scroll shape having a cross-sectional area gradually increasing in the circumferential direction towards a fuel gas exit 33. However, it may not have a scroll shape, and the exhaust gas may be exhausted from the full circumference or from a part of it as long as the volume of the exhaust chamber 32 communicating with the diffuser portion 31 is sufficient.

The midget gas turbine of the present invention further comprises a steel disk 21 holding a disk-shaped permanent magnet 20 having at least one pair of N-pole and S-pole disposed alternately in the circumferential direction. The steel disk 21 is integrally attached to the first hollow axis 4 or the second axis 7 so as to be co-axial with the first hollow axis 4 and/or the second axis 7. At least one wire-wound coil 22 made of an electroconductive material is disposed in the circumferential direction so as to face the disk-shaped permanent magnet 20, and the wire-wound coil 22 is fixed to a stator 35 to constitute a construction that a gas turbine is integrally connected with an electric generator, whereby a light-weight, compact and low-cost midget gas turbine electric generator can be provided.

Here, a wire-wound coil 22*a* in FIG. 1 shows a wire-wound coil group to take out a single-phase alternate current, and a wire-wound coil 22*b* shows a wire-wound coil group having a Y-wiring or a Δ-wiring.

The midget gas turbine electric generator of the present invention having an electric generator integrally connected, may further comprises an AC/DC converter for converting a single-phase alternate current obtained from a wire-wound coil group 22*a* or a three-phase alternate current obtained from a wire-wound coil group 22*b* into a direct current, or an inverter for converting it into the same voltage and frequency of a commercial power source, and a fuel flow controller for controlling the output voltage to be constant regardless of the level of electric power load, whereby the midget gas turbine electric generator of the present invention possesses all necessary functions as an electric generator.

Here, each of the AC/DC converter or the inverter and the fuel flow controller may be accommodated in the same container accommodating the midget gas turbine electric generator of the present invention, whereby the convenience can be further increased.

EXAMPLE

Figure 3:
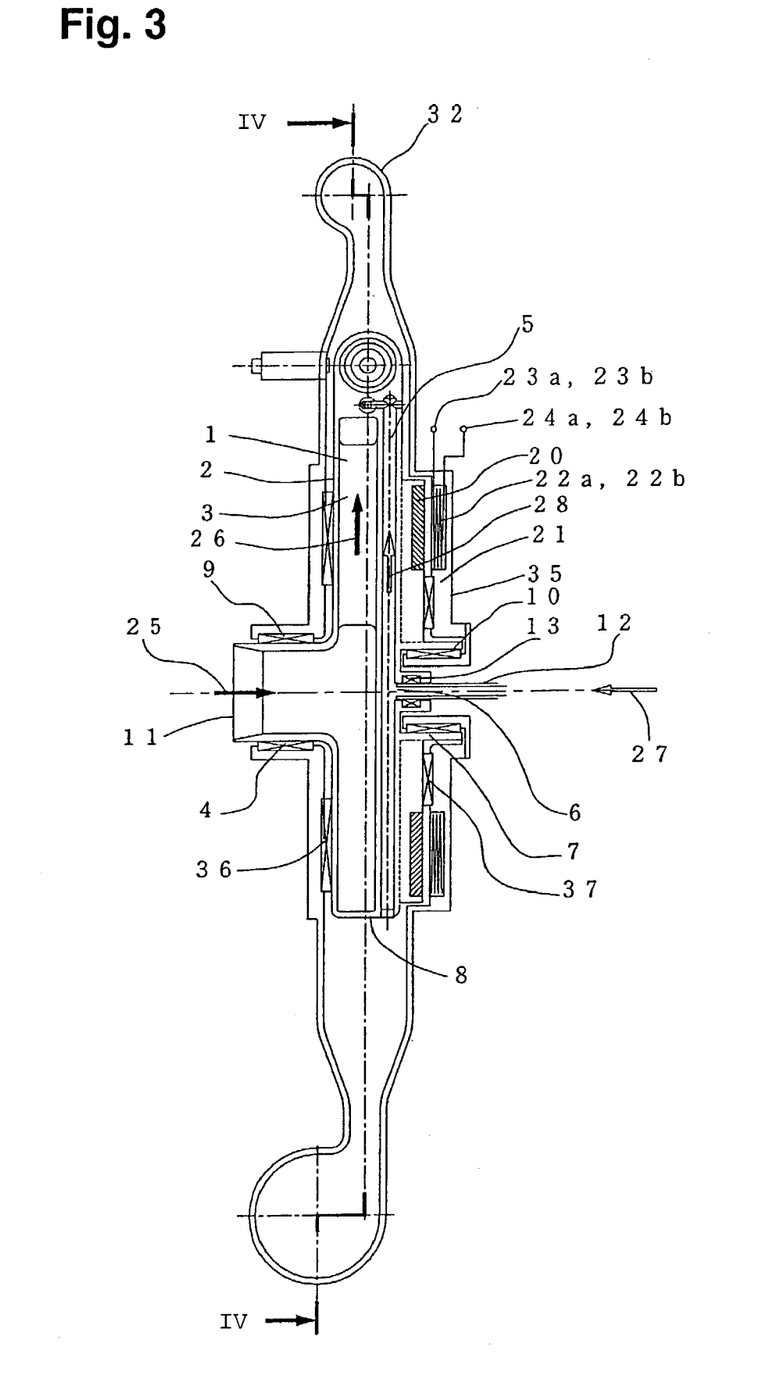
FIG. 3 is a front cross-sectional view of an example of the midget gas turbine of the present invention.
Figure 4:
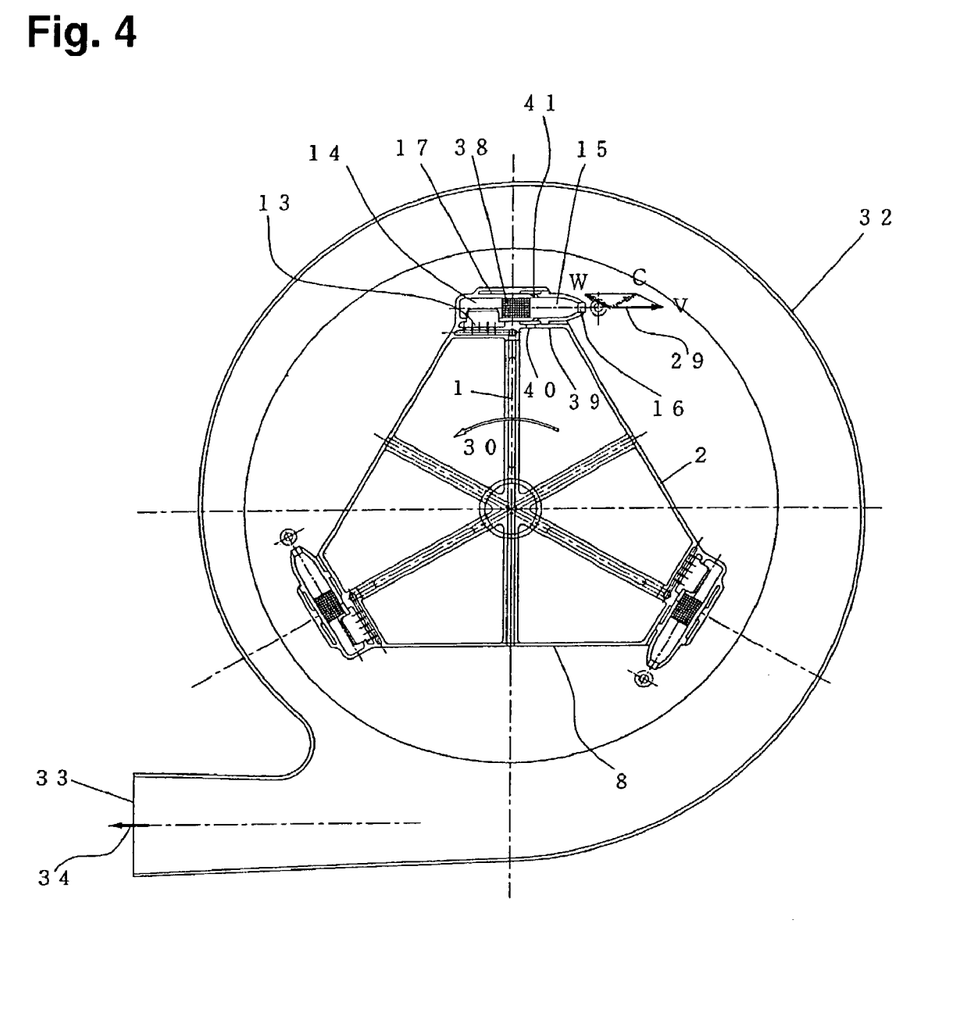
FIG. 4 is a cross-sectional view taken along a line IV-IV in FIG. 3.

FIG. 3 and FIG. 4 show a construction further developed from the construction shown in FIG. 1 and FIG. 2 showing the basic principle, which is closer to the structure actually used. FIG. 3 is a front cross-sectional view of a midget gas turbine electric generator as an embodiment of the present invention, and FIG. 4 is a cross-sectional view taken along a line IV-IV in FIG. 3. The structure shown in FIG. 3 and FIG. 4 differs from the structure shown in FIG. 1 and FIG. 2 in the following five points, but it does not apart from the basic principle shown in FIG. 1 and FIG. 2.

(1) Three combustion chambers are disposed at rotationally symmetric positions on the circumference for improving the stability against vibrations and output power as a turbine.

(2) The combustion chambers have a dual cylindrical structure which enables to cool the combustion chamber wall to prevent the reduction of the strength of the combustion chamber due to a high temperature.

(3) A header portion of a fuel nozzle is relocated to a position upstream from the cylindrical portion of the combustion chamber so that the header portion is parallel to the side wall of the irregular-shaped hollow disk to reduce the length of the combustion chamber.

(4) The combustor is so constructed as to dispose an oxidation catalyst for a catalyst combustion, whereby the fire is not lost even with a lean fuel-air mixture, and a stable combustion can be obtained.

(5) The second axis is made to be a hollow axis supported by bearings at an inner surface of the hollow axis, whereby its length in the axial direction is reduced to achieve a further space-saving.

In the following, description will be made focusing on a part of the construction different from FIG. 1 and FIG. 2 showing the basic principle. Here, parts having the same function as FIG. 1 and FIG. 2 are designated by the same symbols as FIG. 1 and FIG. 2.

The irregular-shaped hollow disk 2 has a substantially triangular cross-section, three combustion chambers 17 are disposed in the vicinity of the respective top of the triangle, and a guiding vane 1 is disposed in the irregular-shaped disk 2, extending radially towards the direction of the top of the triangle. By rotating the irregular-shaped disk 2, the external air sucked from the end 11 of the first hollow axis communicating with a disk-shaped space 3, is supplied as it is centrifugally compressed and reaches a mixing portion 14 located in the vicinity of the outermost peripheral portion of the irregular-shaped disk 2.

On the other hand, a fuel supplied into a fuel supplying pipe 12, is supplied through a fuel supplying hole 6 provided in a central portion of the second axis 7 as it is sealed by a sealing device 13 from the external air. Then the fuel is supplied through a fuel conduit 5 provided along the wall of the irregular-shaped hollow disk 2 from its central portion towards a radial direction, and is injected from a fuel nozzle 13 located in the vicinity of the combustion chamber 17.

The fuel injected from the fuel nozzle 13, is mixed in a mixing portion 14 with the air sucked from the end 11 of the first hollow axis and centrifugally compressed in the disk-shaped space 3, to form a mixed gas to flow into a catalyst combustor 38.

The catalyst combustor is constituted by a grid-shaped or honeycomb-shaped substrate made of a heat-resistant metal or a ceramics and coated with a metal comprising a single or a complex component selected from a group consisting of platinum, gold, vanadium, cupper, manganese and palladium, and their oxides. Such a combustor has a merit that a stable combustion can be obtained without losing the fire even if the fuel concentration is extremely low. Particularly, at a time of a high load operation, a stable combustion can be obtained without having a blow-off phenomenon.

Here, by employing a catalyst combustion, the length of the combustor 15 for maintaining a flame can be reduced and the size of the combustion chamber 17 can be reduced, and therefore, there is a merit that a centrifugal stress generated in the irregular-shaped hollow disk 2 by its rotation can be reduced.

In this Example, a double shell structure is employed wherein the combustion chamber 17 is disposed in a cylindrical shell 39 of the irregular-shaped hollow disk 2, an opening 40 is provided to introduce a cooling air between the shells, and a cooling hole 41 is provided for film cooling of the internal surface of the combustion chamber 17. Such a structure reduces temperature at the portion of combustion chamber 17 exposed to a high temperature and maintains a sufficient strength. In this case, it is preferred to employ a high strength ceramics such as $Si_2N_4$ or SiC as a material for the combustion chamber 17 since it is applied with a strong centrifugal force and has a high temperature.

Further, in this Example, three combustion chambers 17 are disposed at rotationally symmetric positions. Such a structure is expected to provide a merit of obtaining about 50% increase of the output power as compared with a construction having two combustion chambers disposed 180° symmetric positions shown in FIG. 1 and FIG. 2, and expected to have a merit of increasing the stability against vibrations.

Here, the structure that the radius of the irregular-shaped hollow disk is maximum at positions where the combustion chambers are disposed and is minimum at positions between the combustion chambers to reduce the heat stress in the circumferential direction is the same as the structure shown in FIG. 1 and FIG. 2.

Further, in this embodiment, since the construction is so made that the second axis is made to be a hollow axis supported by a bearing 10 at its inner wall, the size in the axial direction can further be reduced as compared with a case that the second axis is supported by a bearing 10 at its outer surface as shown in FIG. 1 and FIG. 2. Such a structure is expected to exhibit a large effect to realize a small-sized light-weight device.

Figure 5:
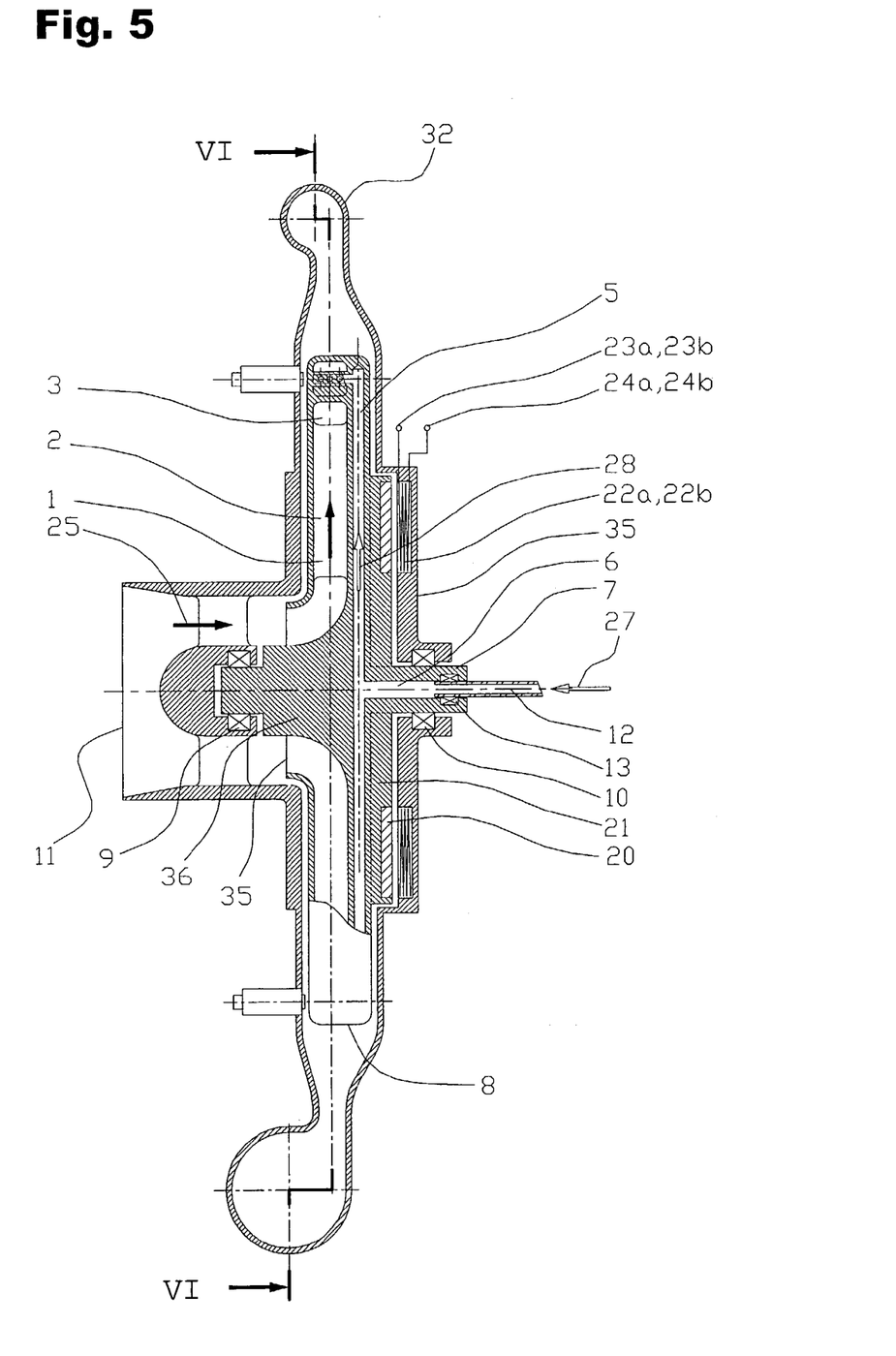
FIG. 5 is a front cross-sectional view of another example of the midget gas turbine of the present invention.
Figure 6:
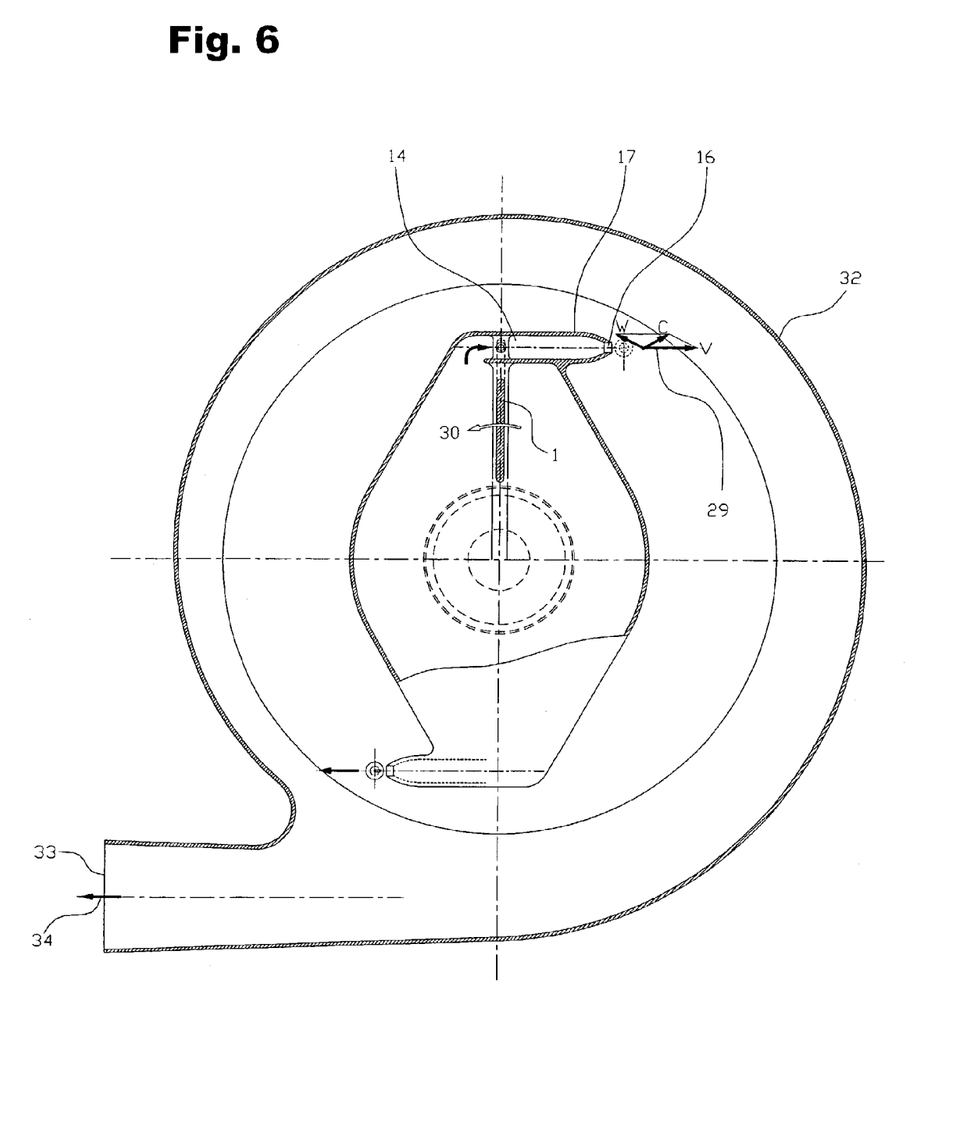
FIG. 6 is a cross-sectional view taken along a line VI-VI in FIG. 5.

FIG. 5 and FIG. 6 show another embodiment. In the embodiment shown in FIG. 3 and FIG. 4, the introduction of the external air into the inside of the irregular-shaped hollow disk 2 is performed through the hollow portion of the first hollow axis 4. On the other hand, in the embodiment shown in FIG. 5 and FIG. 6, the introduction of the external air into the inside of the irregular-shaped hollow disk 2, is performed without being passed through the hollow portion of the first hollow axis 4 but through an opening formed at a circumferential position of a bearing 9 for the first hollow axis 4. In detail, an air suction port 35 is formed at one side of a central portion of the irregular-shaped hollow disk 2, a first axis 36 having a smaller diameter than the air suction port 35 and extending from the central portion of the irregular-shaped hollow disk 2 towards a side of the air suction port located at the opposite side of the second axis 7 extending from the central portion of the irregular-shaped hollow disk 2, the second axis 7 and the first axis 36 are rotatably supported by a bearing 10 and a bearing 9 respectively, and the bearing 10 and the bearing 9 are supported by a structure connected to the exhaust chamber 32 as a stationary portion.

A suction air is sucked from a non-rotational air suction port 11 towards a direction indicated by an arrow 25, passed through a circular conduit formed between the air suction port 35 provided at a central portion of the irregular-shaped hollow disk 2 and the axis 36, and passed into the disk-shaped space 2. The portions not described specifically above have structures and functions as ones described in FIG. 1 and FIG. 2.

The merit of employing such structure is that rolling bearings or slide bearings can be employed as the bearing 9 and the bearing 10. It is preferred to make the diameter of the axis small so long as it is acceptable in terms of the strength in order to reduce a power loss by the bearings.

The method of sucking air from the end 11 of the first hollow axis 4 described with reference to FIG. 1 and FIG. 2, is suitable in a case where the rotor is supported by an air bearing or a magnetic bearing which requires a small force to make the axis float. In such cases, the diameter of the axis needs to be increased to increase the circumferential velocity of the bearing to obtain a force to make the axis float.

As described above, whether the system that the air suction port is provided at the end of the hollow axis as shown in FIG. 1 and FIG. 2 is employed, or the system that the air suction port is provided on the outer circumference side of the axis as shown in FIG. 5 and FIG. 6 is employed, depends on the type of bearing for supporting the rotor of the present invention. However, the originality of the present invention will not be impaired by employing any of these structures.

What is claimed is:

1. A midget gas turbine comprising:
    a casing;
    an irregular-shaped hollow disk rotationally attached to a casing; said irregular-shaped hollow disk having a hollow portion constituting a bursiform space having a closed peripheral portion in which a guiding vane is provided, and having a radius changing with respect to the circumferential direction;
    a fuel conduit provided from a central portion towards a portion of the outer peripheral portion of the irregular-shaped hollow disk and communicated with a fuel nozzle provided in the vicinity of the outer peripheral portion of the irregular-shaped hollow disk; and
    at least two combustion chambers each comprising a mixing portion for mixing a fuel injected from the fuel nozzle with an external air centrifugally compressed by the guiding vane, a combustor and a combustion gas discharge nozzle portion; said combustion chambers being provided at rotationally symmetric positions at the outer peripheral portion of the irregular-shaped hollow disk where the radius becomes maximum;
    wherein an external air taken in the hollow portion of the irregular-shaped hollow disk is compressed by the guiding vane, supplied to the combustion chambers, mixed with a fuel supplied from the fuel conduit to be burnt, and a combustion gas discharged from the combustion gas discharge nozzle is discharged towards a substantially circumferential direction of the irregular-shaped hollow disk, whereby the irregular shaped hollow disk is driven by the reaction of the combustion gas.

2. A midget gas turbine comprising:
    an irregular-shaped hollow disk having a hollow portion constituting a bursiform space having a closed peripheral portion in which a guiding vane is provided, and having a radius changing with respect to the circumferential direction, wherein
    said irregular-shaped hollow disk has a first cylindrical hollow axis communicated with a disk-shaped space formed inside the irregular-shaped hollow disk, and a second axis having in its central portion a fuel supplying hole communicated with a fuel conduit provided along a wall of the irregular-shaped hollow disk and extended from its central portion towards its periphery,
    said first hollow axis and said second axis protrude from respective sides of a central portion of the irregular-shaped hollow disk, to be supported rotatably by bearings, and
    said first hollow axis has an end opening to the external air so that the disk-shaped space is communicated with the external air;
    a fuel supply pipe inserted into the fuel supply hole at the central portion of the second axis to supply fuel from outside, and provided with a sealing device between the fuel supplying hole and the fuel supplying pipe to prevent external air from entering and to provide a rotatable structure;
    said fuel conduit being provided along the wall of the irregular-shaped hollow disk to be communicated with a fuel nozzle provided in the vicinity of the outer periphery of the irregular-shaped hollow disk;
    at least two combustion chambers each comprising a mixing portion for mixing a fuel injected from the fuel nozzle with an external air centrifugally compressed in the disk space, a combustor and a combustion gas discharge nozzle portion; said combustion chambers being provided at rotationally symmetric positions at the outermost peripheral portion of the irregular shaped hollow disk; and
    an ignition plug or an ignition pilot burner provided at the casing wall in the vicinity of the outlet of the combustion gas discharge nozzle;
    whereby a combustion gas discharged from the combustion gas discharge nozzle portion is discharged towards a substantially circumferential direction of the irregular-shaped hollow disk.

3. The midget gas turbine according to claim 1, wherein the external air is air or an oxidizing gas containing an oxidizing agent.

4. The midget gas turbine according to claim 1, wherein each of the combustion chambers is a catalyst combustion chamber employing as a catalyst a metal or metal oxide consisting of platinum, gold, vanadium, copper, manganese and/or palladium.

5. The midget gas turbine according to claim 1, wherein a rolling bearing, a slide bearing, a magnetic bearing or a static or dynamic type gas bearing is used as the bearing.

6. The midget gas turbine according to claim 1, which further comprises an electric generator comprising:
   an electric generator disk holding a disk-shaped permanent magnet having at least one pair of N-pole and S-pole arranged alternately in the circumferential direction, said electric generator disk being attached to the irregular-shaped hollow disk so as to be coaxial with it and rotatable about its axis;
   at least one wire-wound coil made of an electro-conductive material disposed in the circumferential direction so as to face the disk-shaped permanent magnet, wherein a wire-wound coil is fixed to a stator to obtain a single-phase alternate current from both ends of the wire-wound coil, or a plurality of wire-wound coils are grouped to constitute a Y-wiring or a Δ-wiring, and fixed to a stator to obtain a three-phase alternate current from both ends of the grouped wire-wound coils.

7. The midget gas turbine according to claim 1, which further comprises an electric generator comprising:
   a steel disk holding a disk-shaped permanent magnet having at least one pair of N-pole and S-pole disposed alternately in the circumferential direction, said steel disk being integrally attached to a first hollow axis or a second axis so as to be co-axial with the first hollow axis and/or the second axis;
   at least one wire-wound coil made of an electro-conductive material disposed in the circumferential direction so as to face the disk-shaped permanent magnet, wherein a wire-wound coil is fixed to a stator to obtain a single-phase alternate current from both ends of the wire-wound coil, or a plurality of wire-wound coils are grouped to constitute a Y-wiring or a Δ-wiring and fixed to a stator to obtain a three-phase alternate current from ends of the grouped wire-wound coils.

8. The midget gas turbine according to claim 1, which further comprises an AC/DC converter for converting a single or three-phase alternate current obtained from ends of a wire-wound coil or a grouped wire-wound coils into a direct current, or an inverter for obtaining the same voltage and/or frequency as those from a commercial power source.

9. The midget gas turbine according to claim 2, which further comprises an AC/DC converter for converting a single or three-phase alternate current obtained from ends of a wire-wound coil or a grouped wire-wound coils into a direct current, or an inverter for obtaining the same voltage and/or frequency as those from a commercial power source.

10. The midget gas turbine according to claim 1, which further comprises a fuel flow controller for detecting a voltage and a frequency of three-phase alternate current obtained from ends of a wire-wound coil or a grouped wire-wound coils and maintaining the detected voltage and the frequency to be constant, or a fuel flow controller for detecting an output voltage obtained at output terminals of a AC/DC converter and maintaining the output voltage to be constant.

* * * * *